United States Patent

Crouse

[15] 3,636,382

[45] Jan. 18, 1972

[54] AUTOMATIC DELAY EQUALIZER

[72] Inventor: William G. Crouse, Raleigh, N.C.

[73] Assignee: International Business Machines Corporation, Armonk, N.Y.

[22] Filed: Mar. 9, 1970

[21] Appl. No.: 17,651

Related U.S. Application Data

[63] Division of Ser. No. 665,074, Sept. 1, 1967, Pat. No. 3,539,826.

[52] U.S. Cl. ............................307/262, 328/155, 331/36 C, 332/31 T

[51] Int. Cl. ..........................................................H03k 1/12

[58] Field of Search.............333/18; 328/155; 307/230, 295, 307/262; 331/36, 36 C, 36 L, 180, 135–137; 334/15; 332/28, 16 T

[56] References Cited

UNITED STATES PATENTS

| | | | |
|---|---|---|---|
| 3,011,135 | 1/1961 | Stump et al. | 333/18 X |
| 2,870,421 | 1/1959 | Goodrich | 332/16 X |
| 3,412,340 | 11/1968 | Chao | 330/29 |
| 2,427,366 | 9/1947 | Mozley et al. | 328/155 X |

*Primary Examiner*—Robert Segal
*Assistant Examiner*—James B. Mullins
*Attorney*—Hanifin and Jancin and John C. Black

[57] ABSTRACT

An inverting amplifier includes a shunt feedback impedance element connected between its input and output terminals. The feedback current is divided between a series input resistance R*in* and an impedance R*s* shunting R*in*. Either R*s* or R*in* is in the form of a variable impedance semiconductor device and a suitable source of control signals is applied to the semiconductor device to cause it to have a variable impedance. This variable impedance causes the output impedance Z*o* of the amplifier to vary as a function of the input control signals to the semiconductor device. The output impedance is resistive, capacitive, inductive, or the like, depending upon the nature of the feedback impedance of the amplifier; and the device is useful in varied applications such as automatic gain control, frequency and phase control, power regulation, delay equalizers, modulators, and the like.

3 Claims, 19 Drawing Figures

INVENTOR
WILLIAM G. CROUSE

BY John C. Black
ATTORNEY

AUTOMATIC DELAY EQUALIZER

This application is a division of the copending application of William G. Crouse, the inventor herein, Ser. No. 665,074, filed Sept. 1, 1967, now U.S. Pat. No. 3,539,826, issued Nov. 10, 1970.

BACKGROUND OF THE INVENTION

There has long been a need for electronically variable impedances. An automatic gain control circuit usually requires a resistance which can be varied electronically. An automatic frequency control circuit frequently requires a capacitance or an inductance, the value of which can be controlled by an electrical signal. There are devices which approach this problem. The nonlinear forward voltage-current characteristic of a semiconductor diode can have its dynamic resistance changed by varying the bias current through it. The junction capacitance of a semiconductor diode can be varied by changing the reverse voltage applied across the diode. The inductance of an iron core choke can be varied by applying a bias current to the coil. However, the limitation of all these devices is that the impedance of the device is nonlinear so that only very small signals can be applied to the impedances. Otherwise, the nonlinear characteristics will cause excessive distortion.

An article by Fred Susi in the July 19, 1963 issue of ELECTRONICS, describes at pages 60–62 the general concept of operating a transistor as a linearly variable resistance for signal attenuation. Briefly, the collector electrode of the transistor is isolated from direct current voltage supplies. Signals which are to be attenuated are applied to a voltage divider including an input series resistance and the emitter-collector circuit of the transistor. Output signals are taken across the emitter-collector circuit. The input and output terminals are capacitively coupled to the collector electrode. However, this variable resistance is necessarily limited to an environment wherein the output voltage will be extremely small, since the collector current levels are very low and since the output voltage is the product of the collector current and the low emitter-to-collector impedance.

In a copending application of Joseph P. Pawletko, Ser. No. 469,499, filed July 6, 1965 and entitled "Character Recognition Apparatus," issued Oct. 7, 1969, as U.S. Pat. No. 3,471,832, there is described a variation of the Susi structure whereby the transistor impedance varies linearly with input voltage to the base electrode of the transistor. Again, the output voltage from the attenuator is extremely low as in the case of the Susi structure.

The subject matter of the Susi article and of the Pawletko application is incorporated herein by reference as if set forth in their entirety.

It is an object of the present invention to provide an improved variable resistance device which can be utilized in an environment of large signals and which is variable at electronic speeds without introducing transients or distortion in its output.

It is another object of the present invention to provide a large signal electronically variable impedance which can be resistive, capacitive, inductive in nature, or actually equivalent to any two-terminal impedance network.

The improved circuit configuration is characterized by its ability to take any two-terminal element or network and multiply its current characteristic by an amount which can be controlled electronically.

SUMMARY OF THE INVENTION

The improved electronically variable impedance is characterized by an inverting amplifier having a shunt impedance element or network connected between its input and output terminals. Feedback current flowing in the feedback network is divided between a series input impedance of the amplifier and a shunt input impedance to the amplifier. Either the series or shunt input impedance has an electronically variable semiconductor device which forms a part of the input impedance. A source of control signals is applied to the semiconductor device to change its impedance in a desired manner. As this impedance is changed, the relative proportions of the feedback current in the series and shunt input impedance paths are varied accordingly. This in turn causes a change in the output impedance of the amplifier as seen from the circuits to which it is coupled.

This basic circuit configuration which provides an electronically variable impedance can be utilized in many different types of electronic applications. A few of these applications are: an automatic delay equalizer, an automatic phase control, an automatic frequency control, an automatic gain control, an analog multiplier, a power supply filter-regulator, a modulator and a circuit for slow turnoff of a source of signals.

BRIEF DESCRIPTION OF THE DRAWINGS

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figures 1, 2:
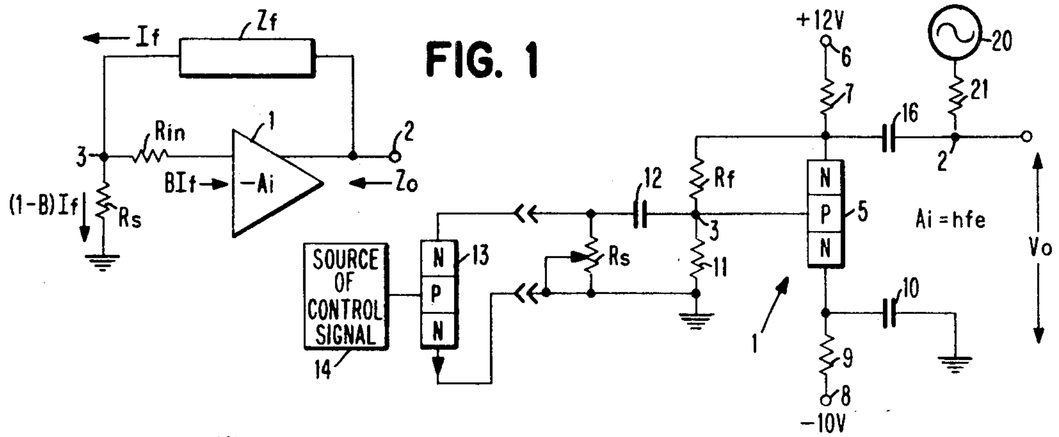
FIG. 1 illustrates the basic concept of the present invention.
FIG. 2 is a schematic diagram of a simplified implementation of the basic concept utilizing a variable shunt impedance.

FIG. 1 is shown merely for purposes of illustrating the general concept upon which an improved variable impedance circuit is based. Thus, FIG. 1 shows an amplifier 1 having an output terminal 2 which is out-of-phase with respect to an input terminal 3. A negative feedback impedance $Zf$ is connected between the input and output terminals. The input terminal 3 is connected to the amplifier 1 by way of a series input resistance R*in* and is connected to ground potential by way of a shunt input resistance R*s*. A current, I*f*, flows through the impedance $Zf$ and is divided between the parallel paths comprising the impedance R*in* and R*s*. Thus a current B×T*f* flows into the amplifier and a current (1–I*f* flows through R*s* to ground.

It is common knowledge in feedback theory that if am impedance $Zf$ (FIG. 1) is connected from the output 2 of a current amplifier 1 back to the input 3 of that amplifier, the output impedance $Zo$ will decrease if the current amplifier has the output current out-of-phase from its input current. In fact, if all of the current which flows through this feedback impedance $Zf$ flows into the input of the amplifier and the current gain of the amplifier is A*i*, then the apparent output impedance $Zo$ will be:

$$Zo=\frac{Zf}{Ai+1}$$

assuming the input impedance is zero.

If, at the input of the amplifier, a network is connected to shunt away some fraction of the feedback current so that the input current to the amplifier is B times the current through the impedance $Zf$, then the output impedance $Zo$ becomes:

$$Zo=\frac{Zf}{(Ai\times B)+1}$$

Now, if the amplifier has a finite input resistance R*in* and a resistance R*s* shunts this input, then the value of *B* can be determined as follows:

$$B=\frac{Rs}{Rs+Rin}$$

The output impedance can now be calculated as follows:

$$Zo=\frac{Zf+\frac{RsRin}{Rs+Rin}}{\left(Ai\frac{Rs}{Rs+Rin}\right)}+1$$

(*Rs* and *Rin* being in series with *Zf*, must be added to *Zf*) and if:

$$Rs<<Rin$$

$$Ai\frac{Rs}{Rs+Rin}>>1$$

$$Zf>>\frac{RsRin}{Rs+Rin}$$

Then:

$$Zo\simeq\frac{ZfRin}{AiRs}$$

It can be seen that *Zo* is proportional to *Rin* and inversely proportional to *Rs*. If either or both R*in* and R*s* can be changed, this will change the output impedance *Zo*. Since the signal presented to R*s* and R*in* can be quite small compared to the signal at the output of the amplifier, this variable resistance R*in* or R*s* can be the nonlinear voltage-current characteristic of a semiconductor diode, or preferably, a saturated transistor with controlled base current as described in the above-identified issue of ELECTRONICS or the above-identified copending application.

*Zf* can by any type impedance and, therefore, an electronically variable resistance, capacitance, inductance, diode or any other two-terminal network can be provided. The limitations of the voltage and current which can be applied to the variable impedance *Zo* are determined by the limitations of the amplifier in a manner quite similar to the limitation of the normal signal to be developed on the output of the amplifier.

By proper choice of the variable impedance for R*in* or R*s*, and the means for varying the resistance, it is possible to change the output impedance *Zo* rapidly and without developing a transient on the output incident to a change in the control signal. This has been a major design problem in the past.

Figure 3:
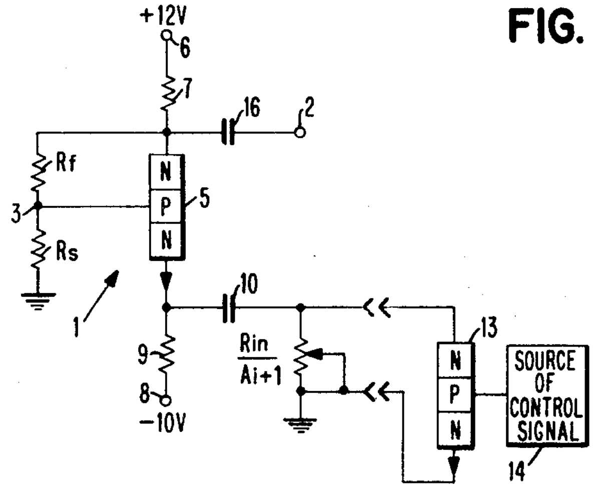
FIG. 3 is a diagrammatic illustration of another basic implementation utilizing a variable series impedance element.
Figure 4:
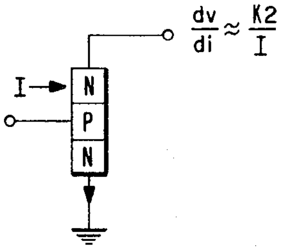
FIGS. 4 and 5 and 6 illustrate semiconductor devices which may be utilized as a variable resistance device in the series or shunt input impedance of the amplifier.
Figure 5:
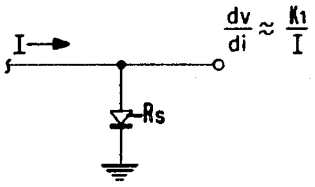
Figure 6:
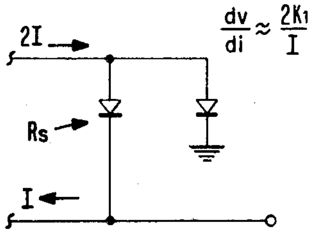

FIGS. 2 and 3 illustrate two implementations of the improved variable impedance device. FIG. 2 illustrates an embodiment in which the shunt resistance R*s* is variable and FIG. 3 illustrates an embodiment in which the series resistance R*in* is variable. Similar reference numerals will be utilized for corresponding components in FIGS. 2 and 3.

In FIG. 2, the amplifier 1 comprises a transistor 5 connected in a common emitter configuration and having input and output terminals 3 and 2. The collector electrode of the transistor 5 is connected to a positive supply terminal 6 by way of a resistor 7. The emitter electrode is connected to a negative supply terminal 8 by way of a resistor 9. The emitter terminal is also connected to ground potential by way of a capacitor 10. The base electrode of the transistor 5 is connected to ground potential by way of a resistor 11 and is connected to the collector electrode by way of a negative feedback resistor R*f*. The base electrode is also connected to ground potential by way of a low-impedance coupling capacitor 12 and the variable shunt resistance R*s*. In the preferred embodiment, this R*s* will be in the form of a transistor such as transistor 13 which in turn has its base electrode coupled to a source of control signals 14. Capacitor 12 provides DC isolation where required. The collector electrode of the transistor 5 is coupled to the output terminal 2 by way of a low-impedance coupling capacitor 16 which provides DC isolation between the transistor 5 and resistor 21. Capacitor 16 is not needed if DC isolation is not desired.

The amplifier of FIG. 2 is illustrated by way of example only and is in the form of a very simplified amplifier wherein the gain is equal to the $h_{fe}$ of the transistor itself.

Corresponding components in FIG. 3 have been assigned the same reference numeral as the corresponding components in FIG. 2. Thus the embodiment of FIG. 3 includes a transistor 5 having its collector and emitter electrodes coupled to supply terminals 6 and 8 by resistors 7 and 9. A feedback resistor R*f* is connected between the base and collector electrodes, and a resistor R*s* is connected between the base electrode and ground. Transistor 13 forms the variable R*in* and is connected in series with the capacitor 10 between the emitter electrode and ground. The source 14 controls the transistor resistance.

Suitable operation of the embodiment of FIGS. 2 and 3 was achieved utilizing the following component values:

| Resistors | Value in Ohms |
|---|---|
| R*f* | 10,000 |
| R*s* of FIG. 3 | 2,000 |
| 7 | 3,000 |
| 9 | 5,100 |
| 11 | 2,000 |

Figure 7:
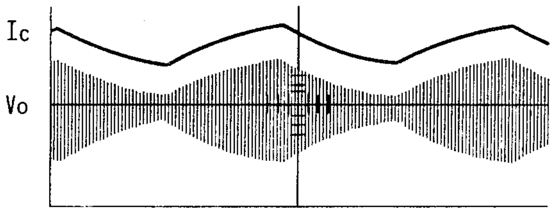
FIGS. 7, 8 and 9 are waveforms illustrating the response of the voltage divider circuit of FIG. 2 wherein the variable impedance of the present application is used to shunt the output voltage.

FIG. 7 is a reproduction of waveforms obtained by the embodiment of FIG. 2 wherein R*s* was in the form of the transistor 13, wherein the output terminal 2 was connected to a source of voltage signals 20 by means of a resistor 21 and wherein the source 14 provided a variable current I*c* (FIG. 7) to the base of the transistor 13. The value of the resistor 21 was substantially greater than the maximum output impedance of the amplifier 1 whereby changes in the value of the output impedance did not substantially affect the value of the current flowing through the voltage divider comprising the resistor 21 and the amplifier 1. With the current substantially constant, the output voltage across the amplifier is a linear function of its impedance. Its impedance is a linear function of the base current I*c* (FIG. 7) in transistor 13; hence, the output voltage V*o*, (FIG. 7) varies linearly with the control current I*c*. The maximum peak-to-peak amplitude of V*o* is approximately 11 volts.

Figure 8:
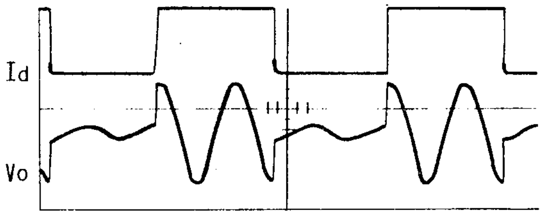

FIG. 8 illustrates the rapid, undistorted, transient-free response of the voltage divider of FIG. 2 to digital control signals I*d* from the source 14.

Figure 9:
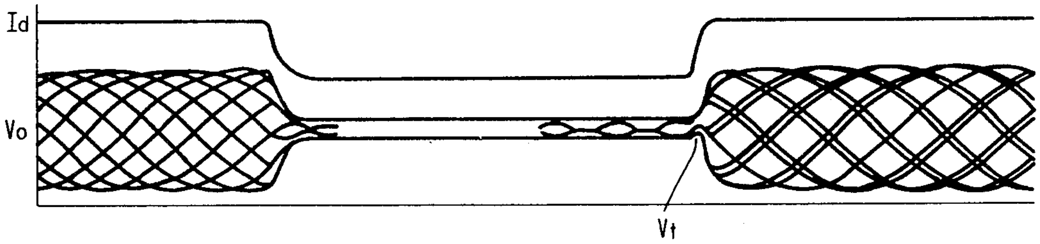

FIG. 9 illustrates the response of the voltage divider of FIG. 2 to digital control signals I*d* from the source 14. Several cycles of the output signal V*o* and the control current I*d* are superimposed over each other to illustrate the rapid and faithful response to changes in I*d* at any point in the cycle of V*o* without transients. One transient condition V*t* (FIG. 9) did occur and was traced to the fact that the transistor 13 was a low-speed transistor. The use of high-speed transistors obviates this transient.

In each of the following embodiments of FIGS. 10–17, the amplifier (such as amplifier 41 of FIG. 10) is of the differential amplifying type having negative feedback. One illustration of a suitable differential amplifier is given in copending U.S. Pat. application of James C. Greeson, Jr., Ser. No. 491,962, filed Oct. 1, 1965 for a "Monolithically Fabricated Operational Amplifier Device With Self Drive," issued Mar. 25, 1969, as U.S. Pat. No. 3,435,365. It will be appreciated that other known differential amplifiers may be used. If the input voltage of the differential amplifier is held near zero volts, the removal of the capacitor e.g., 12, FIG. 1) results in little or no DC flow between the variable resistance transistor (such as transistor 42, FIG. 10) and the differential amplifier. Hence, as will be seen, the DC isolating capacitor is not included in the embodiments of FIGS. 10–17.

AUTOMATIC DELAY EQUALIZER—FIG. 10

Data communication over telephone lines results in delays in the data signals at the receiver, which delays are a function of frequency. Certain midfrequencies are delayed a lesser amount than a frequency which is higher or lower than this frequency. This delay characteristic varies considerably from one line to another. To overcome this problem, delay equalizers have been used.

Figure 10:
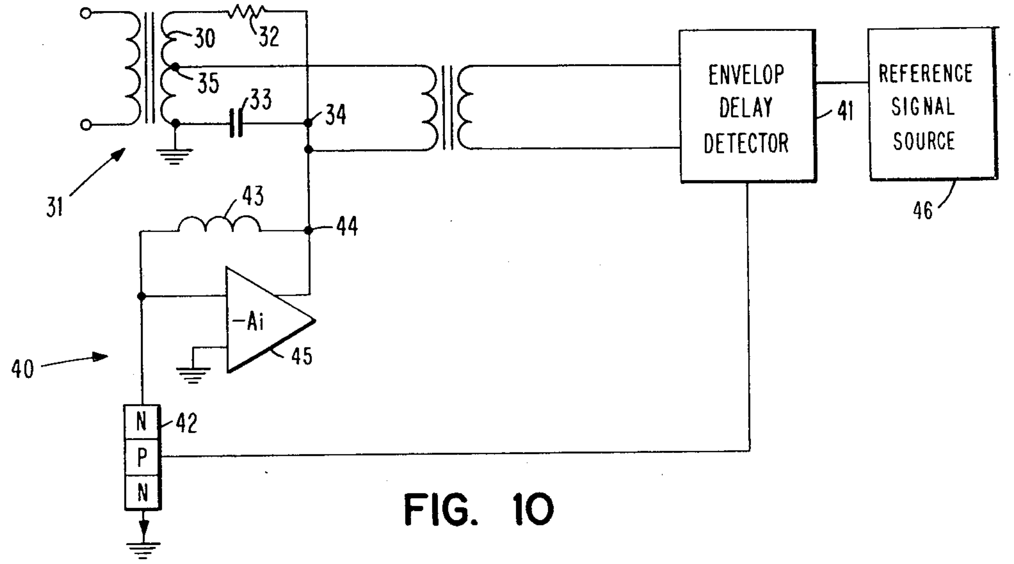
FIGS. 10–19 illustrate the use of the present invention in achieving improved performance in a delay equalizer, an automatic frequency control circuit, an analog multiplier, a power supply filter-regulator, an automatic gain control, a second automatic gain control, an automatic phase control, a subharmonic oscillator, a modulator and a slow turnoff circuit.
Figure 11:
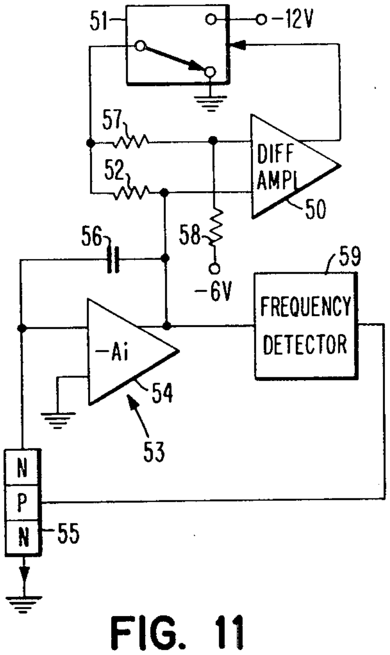
Figure 12:
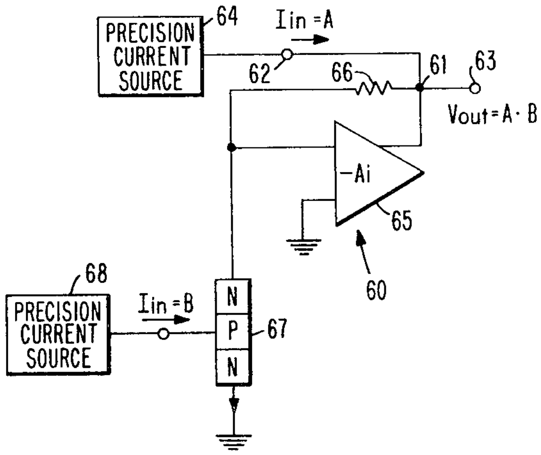

Typical delay equalizers that are frequently used to obviate this problem are somewhat similar to that shown in FIG. 10 and comprise a center-tapped secondary 30 of a transformer 31 having the two external leads connected by a resistor 32 in series with a parallel tank circuit having a capacitor 33 and an inductor (not shown). The output terminals are from the node 34 between the resistor 32 and tank circuit and the center tap 35 of the transformer. In FIG. 10, the inductor is replaced by an improved variable inductance device 40.

Usually because the problem is so serious, several stages of delay equalizer circuits must be used; and, since each line with which the stages may be used will have different characteristics, provisions are usually made in the circuits themselves for adjustment. The problem is further complicated in that in the typical commercial environment, the line with which the equalizer circuits are being used may be changed, thus necessitating additional adjustments. Typically, the fact that the line has been changed or for some reason has changed its characteristics is not discovered until such time that errors have occurred and their cause has been traced to this particular problem.

In FIG. 10, an improved automatic delay equalizer includes a conventional delay detector circuit 41 which continuously compares the delay in the received signals with a time standard, i.e., a source of reference signals 46, included within the receiver and through a feedback circuit acts upon the delay equalizer circuit to vary its characteristics in such a manner as to provide nearly uniform delay in each of the frequencies which is applied to the detection apparatus within the receiver.

This is achieved in FIG. 10 by making the inductive element of the tank circuit a variable device, i.e., device 40, in accordance with the teachings of the present invention. It will also be noted that alternatively the capacitor of the tank circuit could be made the variable element.

The device 40 includes a differential amplifier 45 having one input grounded and the other input connected to a transistor 42. The transistor 42 forms the shunt resistance R*s* and the input impedance of the amplifier forms the series resistance R*in*. An inductor 43 forms the negative feedback impedance. The output 44 of the amplifier is connected to the capacitor 33 and the resistor 32. The device 40 acts as an inductor, the value of which is a direct function of the base current in the transistor 42.

Assume that a 1-kilocycle signal is delayed for a longer time than a 2-kilocycle signal. When we switch from the 2-kilocycle to the 1-kilocycle train of pulses, we normally have a gap in the signals in the receiver, and when we switch from the 1-kilocycle to the 2-kilocycle train of pulses, we would normally expect to have the signals overlap. It is, therefore, desired to automatically increase the delay in the 2-kilocycle signals by an amount which will cause its total delay to be equal to that of the delay in the 1-kilocycle signal.

This can be accomplished by increasing the resonant frequency of the tank circuit, for example, by decreasing the value of the inductance 40. In order to decrease the inductance, it is necessary to decrease the base current in the transistor 42. Therefore, we must get a decrease in the current level output of the detector circuit 41.

AUTOMATIC FREQUENCY CONTROL—FIG. 11

The improved variable impedance device can be used to control the frequency of oscillators, for example, that shown in copending U.S. Pat. application Ser. No. 448,521 of applicant, filed Apr. 15, 1965, entitled "Data Transmission Apparatus Utilizing Frequency Shift Keying," now U.S. Pat. No. 3,432,616, issued on Mar. 11, 1969.

Briefly, the oscillator includes a differential amplifier 50 having a voltage divider comprising resistors 57 and 58 at one input and an integrator comprising a resistor 52 and a capacitive device 53 at the other input. The output of the amplifier 50 controls a voltage-switching device 51 which applies one or the other of two potentials to the voltage divider and integrator to cause the capacitive device 53 to charge and discharge about an intermediate reference potential. The output of the amplifier 50 is switched to one or the other of two states depending upon the value of the voltage across the capacitive device 53 relative to said intermediate reference potential.

The device 53 is a variable capacitive device constructed in accordance with the teachings of the present application and includes a differential amplifier 54, a transistor 55 which acts as R*s* and a feedback capacitor 56.

It is desired to provide very high precision control of the frequency of oscillation. We take the output from any point in the oscillator, feed it into a conventional frequency detector 59 which produces a predetermined output current when the input frequency is at the desired value and which produces an output current which increases or decreases as an inverse function of the input frequency.

As the input signal to the detector becomes greater than the desired frequency, the output current which is applied to the base electrode of the transistor 55 decreases to increase the value of the shunt impedance. An increase in the transistor shunt impedance will cause the capacitive impedance exhibited at the output of the shunt feedback amplifier to decrease. Thus, the effective capacitive characteristic exhibited by the shunt feedback amplifier is increased in value, restoring the oscillator to the desired frequency of operation.

Similarly, if the frequency of the oscillator is too low, the current output of the detector 59 increases, decreasing the transistor impedance and the capacitance of the amplifier. This in turn increases the frequency of the oscillator to the desired value.

AN ANALOG MULTIPLIER—FIG. 12

The variable impedance circuit 60 is connected to a junction 61 between a current input terminal 62 and a voltage output terminal 63. The current input terminal is connected to a precision current source 64. The junction between the input terminal and the voltage output terminal is shunted to a reference potential by means of the improved variable impedance circuit 60 of the present application.

The circuit 60 includes a differential amplifier 65 having a precision resistor 66 in the shunt feedback path and a shunt impedance in the form of a transistor 67. The base electrode of the transistor is connected to a second precision current source 68.

The output impedance of the circuit 60 is directly proportional to the current level of the second source 68. The output voltage is a direct function of the product of the current value from the first source 64 and the output impedance of the circuit 60 to which it is connected.

In accordance with Ohm's Law, the voltage across the resistance is equal to the resistance times the current applied to the resistance; and, since the resistance is a direct function of the value of the current from the second source 68, the output voltage is a function of the product of the values from the two current sources.

POWER SUPPLY FILTER REGULATION—FIG. 13

The behavior of a charge on the capacitor across a variable capacitance is such that if the capacitance is increased, the voltage will be decreased, and if the capacitance is decreased, the voltage across that capacitance will increase.

In converting an alternating current source to a DC source, the current is usually rectified and then applied to a filter which has a series inductor and a pair of capacitors, each of which connects a respective end of the inductor to ground potential. Suitable means are usually provided to regulate the value of the DC output voltage level.

By replacing the second capacitor with the variable capacitance device of the present application and varying this capacitance as a function of the output voltage in relation to a reference level, the output voltage can be made relatively constant.

Figure 13:
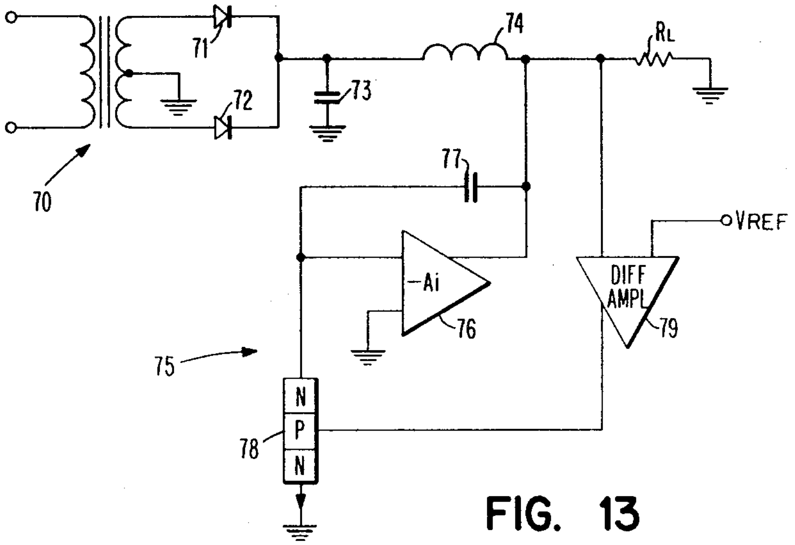

In FIG. 13, the current from a power supply 70 is rectified by diodes 71 and 72 and filtered by capacitor 73, inductor 74 and a variable capacitor device 75. The latter device comprises a differential amplifier 76, a negative feedback capacitor 77 and a transistor 78.

A differential amplifier 79 has one input connected to a reference terminal and a second input coupled to the output of the filter.

If the voltage output of the filter decreases below the reference voltage, the output current from the differential amplifier 79 increases. This increase in current will cause a decrease in the value of the electronically variable resistance of the transistor 78, thereby causing the output capacitance of the shunt feedback amplifier to decrease causing the voltage across it to increase until the output voltage becomes equal to the reference voltage.

Similarly, an increase in the filter output voltage above the reference level causes a decrease in the current output of the amplifier 79 and an increase in the resistance of the transistor 78. The capacitance of the shunt feedback amplifier increases to decrease the output voltage level of the filter.

AUTOMATIC GAIN CONTROL—FIG. 14

Figure 14:
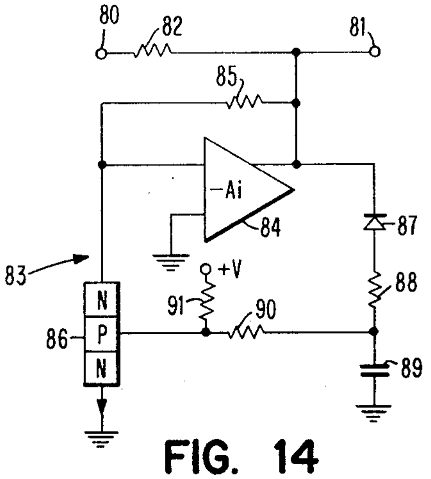

The automatic gain (or level) control circuit of FIG. 14 includes input and output terminals 80 and 81 with a resistor 82 interposed between the terminals. The resistor merely translates voltage into current; we can alternatively provide a current source without the resistor. The variable impedance circuit 83 of the present application is connected between the output terminal and ground potential.

More specifically, the output of a differential amplifier 84 is connected directly to the output terminal 81. One amplifier input terminal is connected to the amplifier output terminal by means of a shunt resistance 85 and is connected to ground potential by way of the electronically variable resistance, i.e., transistor 86. A rectifier and integrator including a diode 87, a resistor 88 and a capacitor 89 is provided for deriving a voltage, the level of which is proportional to the average peak signal level at the terminal 81. This voltage across the capacitor 89 is then applied to the base electrode of the transistor by means of a resistor 90 which translates the voltage to a current. A bias current is provided by way of a resistor 91.

If the average peak level of the output voltage increases above a selected level, the voltage across the capacitor 89 becomes more negative; the base current of the transistor 86 decreases; and the resistance of the transistor 86 increases. This causes the output impedance of the amplifier 84 to decrease, lowering the average peak-to-peak voltage level at the terminal 81.

Alternatively, when the average peak voltage at terminal 81 falls below a selected level, the impedance of the device 83 increases to increase the average peak-to-peak voltage level at 81.

AUTOMATIC GAIN CONTROL—FIG. 15

Figure 15:
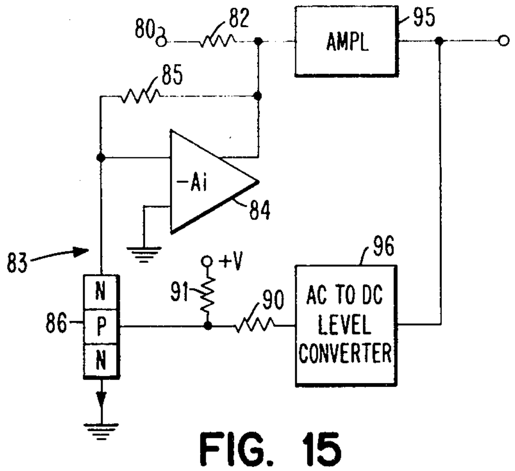

The gain control circuit of FIG. 15 is somewhat similar to that of FIG. 14 except that the base control current for the transistor 86 is derived from the output of an amplifier 95 and the variable impedance device 83 shunts the input of the amplifier 95. Similar components have the same reference numerals.

If the average amplitude of the output of amplifier 95 becomes too high, a converter 96 increases its output current which reduces the bias current into the base of transistor 86. This reduces the output impedance of the device 83 to reduce the level of both the input and output signals of amplifier 95.

AN AUTOMATIC PHASE CONTROL—FIG. 16

In a typical fixed phase control circuit, a center tapped secondary winding 100 of a transformer 101 has its remote terminals connected to a series resistor 102 and capacitor (not shown) network with the output signal being taken from the node between the resistor-capacitor and the center tap of the transformer. This circuit has phase shift characteristics which are a function of the resistor and capacitor, but have ideally no amplitude variations as a function of the frequency.

Figure 16:
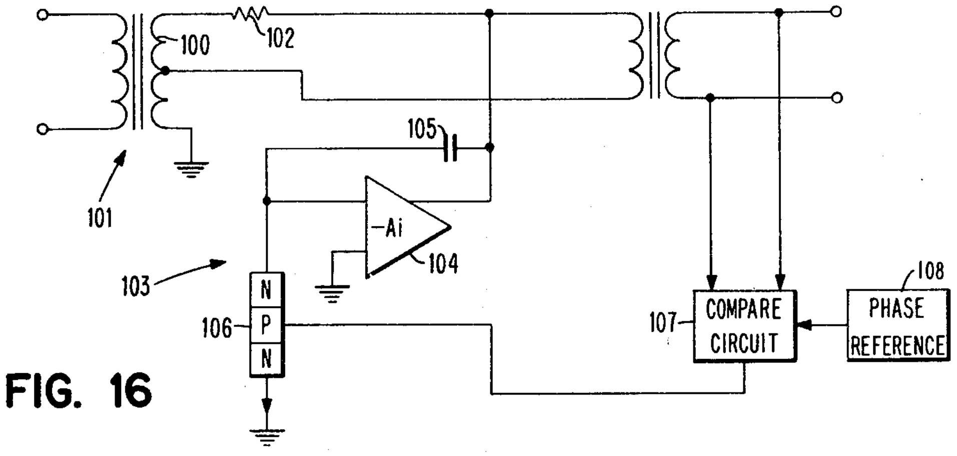

In the automatic phase control circuit of FIG. 16, the capacitor is replaced by the improved electronically variable capacitance device 103. The device 103 includes a differential amplifier 104, a shunt feedback capacitor 105 and a transistor 106. The output of this phase shift circuit is coupled to a compare circuit 107 for comparison with the output of a phase reference source 108 operating at the same frequency. The compare circuit 107 produces an output current which is a function of the relative phases between the received signal and the reference signal. This output current will increase if the phase shift is too great and decrease if the phase shift is not enough.

As this output current decreases, the resistance value of the transistor 106 will increase, thereby increasing the output capacitance of the shunt feedback amplifier causing an increase in phase shift to correct the original error.

An increase in the output current from the compare circuit 107 decreases the transistor resistance, thereby decreasing the output capacitance of the amplifier 104 to decrease the phase shift.

A SUBHARMONIC OSCILLATOR—FIG. 17

It is known that, if a variable capacitance is connected in parallel with an inductor and the variable capacitor is changed at a frequency equal to twice the resonant frequency determined by the inductor and the average capacitance of the capacitor, the circuit will oscillate at the frequency determined by this resonance or half of the frequency at which the capacitance is varied. The improved variable impedance device can provide an electronically variable capacitance. This capacitance can be connected to an inductor of selected value. The input terminal of the variable capacitance device is driven by a signal of twice the frequency of the output resonance, and the output will oscillate at its resonant frequency which is half of the input frequency thereby providing a frequency divider or a subharmonic oscillator.

Figures 17, 18:
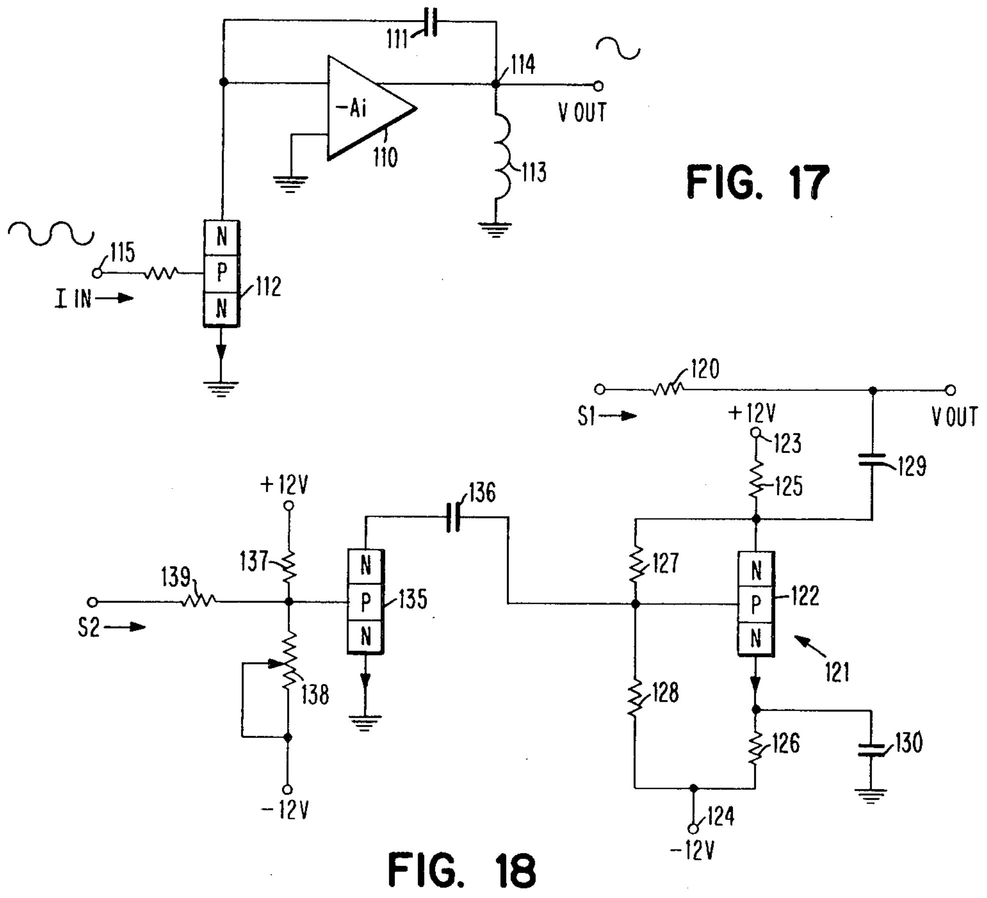

One form is shown in FIg. 17 and includes a differential amplifier 110 having a shunt feedback capacitor 111 and a variable shunt input impedance in the form of a transistor 112. An inductor 113 is connected between the output terminal 114 of the amplifier and ground potential. Input signals are applied to terminal 115 and output signals at half the frequency of the input signals are derived from the terminal 114.

MODULATOR—FIG. 18

FIG. 18 illustrates a form of the present invention utilized to amplitude modulate input signals S1 at a rate determined by control signals S2. In one implementation, the signals S1 ranged from 600 to 2,200 cycles per second with a 3-volt peak-to-peak amplitude. The control signals had a frequency of 200 cycles per second and a 2-volt peak-to-peak amplitude.

The signals S1 are applied to a voltage divider comprising a resistor 120 and a shunt feedback amplifier 121. The amplifier 121 includes a transistor 122 having its collector and emitter electrodes coupled to suitable supply terminals 123 and 124 by resistors 125 and 126. A shunt feedback resistor 127 couples the collector electrode to the base electrode, and a bias resistor 128 couples the base electrode to the terminal 124. Low-impedance coupling and bypass capacitors 129 and 130 are provided.

The output impedance of the amplifier 121 is electronically varied at the frequency of signals S2 by means of common emitter transistor 135 having its collector electrode coupled to the amplifier 121 by capacitor 136. Resistor 137 and resistor 138 set the biased for the transistor 135, and a high-valued resistor 139 couples the signals S2 to the base of the transistor 135 to vary the transistor impedance at the frequency of S2.

Thus the resistance of the transistor 135 varies at the frequency of S2 and in turn causes the output impedance of the amplifier 121 to vary at the frequency of S2. The output voltage Vout will therefore be characterized by signals S1 varying in amplitude at the frequency of S2.

Suitable values for the components of FIG. 18 are as follows:

| Resistors | Value in Ohms |
|---|---|
| 120 | 2,000 |
| 125 | 16,000 |
| 126 | 5,000 |
| 127, 137, 139 | 10,000 |
| 128 | 30,000 |
| 138 | 20,000 potentiometer |

| Capacitors | Value |
|---|---|
| 129 | 6.8 microfarads |
| 130, 136 | 39 microfarads |

SLOW TURN-OFF CIRCUIT —FIG. 19

In data communication systems, undesirable transients frequently occur when oscillators, modulators and the like are turned off rapidly in response to digital control signals. In communication over telephone lines, the lines themselves ring when the signal source is cut off rapidly. In shared line applications where each receiver is coupled to the line by way of a sharply tuned passive filter, the high Q of the filter causes significant ringing when the signal source is turned off suddenly.

Figure 19:
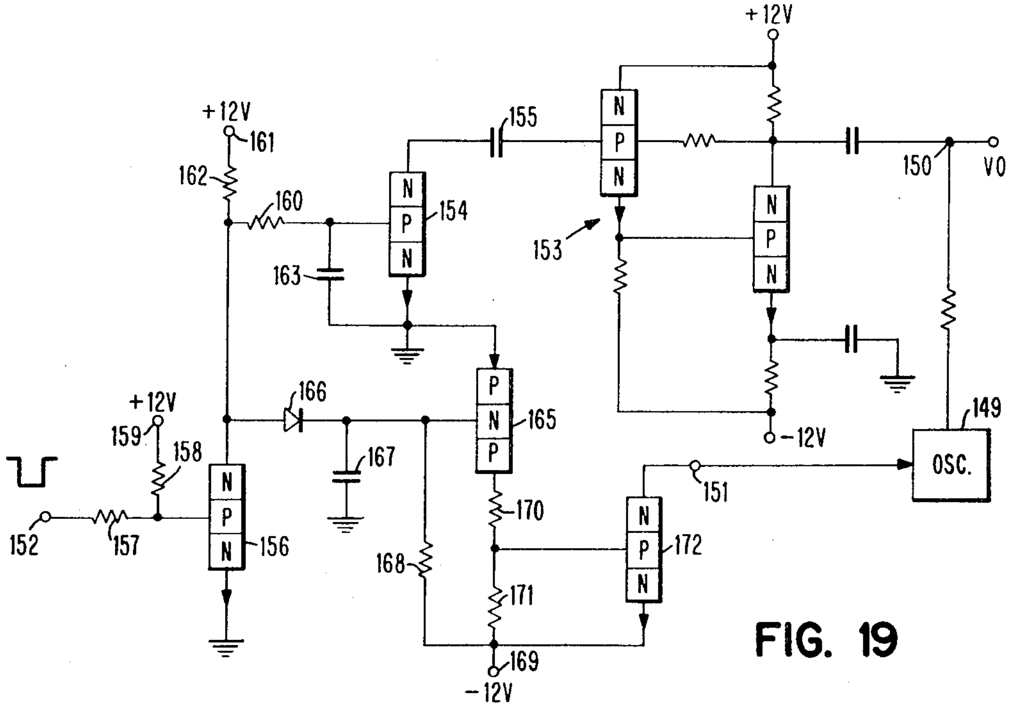

The circuit of FIG. 19 minimizes the resulting transients when a transmitter oscillator 149 is turned off by a digital control signal. This circuit includes a first output terminal 150 which can be coupled to some suitable point in a conventional transmitter circuit between the oscillator and a line driver (not shown) to shunt the output signals from the oscillator to ground. The circuit includes a second output terminal 151 which is coupled to the oscillator to turn it on and off in response to digital signals at an input terminal 152.

The output terminal 150 is coupled to a two-stage shunt feedback amplifier 153 having second collector to first base shunt feedback. The output impedance *Zo* of the amplifier 153 is controlled by a transistor 154 having its collector electrode coupled to the input of the amplifier by a capacitor 155.

The input terminal 152 is coupled to the base electrode of a transistor switch 156 by a resistor 157. A biased resistor 158 is connected between a positive supply terminal and the base electrode of transistor 156. The collector electrode of the transistor 156 is connected to the base electrode of the transistor 154 by a resistor 160 and to a positive supply terminal 161 by a resistor 162. An integrating capacitor 163 is coupled across the base-emitter junction of the transistor 154.

The collector electrode of the transistor 156 is also connected to the base electrode of a transistor switch 165 by a diode 166. An integrating capacitor 167 is connected across the base-emitter junction of the transistor 165. A bias resistor 168 connects the base electrode of the transistor 165 to a negative supply terminal 169.

The collector electrode of the transistor 165 is connected to the terminal 169 by a voltage divider comprising resistors 170 and 171. A transistor switch 172 has its base-emitter junction connected across resistor 171 and its collector electrode to the output terminal 151.

When the input signal level at terminal 152 goes negative, the transistor 156 turns off. The capacitor 167 charges rapidly to turn the transistor 165 off which in turn cuts off the transistor 172; and the oscillator is turned on.

When the transistor 156 turns off, the capacitor 163 also charges (but at a slower rate than capacitor 167) and the transistor 154 turns on slowly at a controlled rate. The impedance of the transistor 154 decreases at a controlled rate and this causes the output impedance *Zo* of the amplifier 153 to increase at a controlled rate to a relatively high maximum value at which it shunts very little of the oscillator output to ground potential.

When the transistor 156 turns on to saturation incident to the level at terminal 152 going positive, the diode 166 reverse biases; and the capacitor 167 discharges slowly through resistor 168 until the base-emitter junction of transistor 165 forward biases. Turnoff of the oscillator is therefore delayed. Meanwhile, the capacitor 163 is discharging through the transistor 156 and resistor 160 to increase the resistance of the transistor 154 at a controlled rate and decreasing the output impedance *Zo* of the amplifier 153 at the desired rate. This gradually shunts an increasingly higher proportion of the oscillator output to ground potential prior to turn off of the oscillator, thereby minimizing turnoff transients.

Suitable values for certain components in the circuit of FIG. 19 are as follows:

| Resistors | Value in Ohms |
|---|---|
| 157 | 8,200 |
| 158 | 18,000 |
| 160 | 15,000 |
| 162 | 1,600 |
| 168 | 10,000 |
| 170 | 22,000 |
| 171 | 3,900 |

| Capacitors | Value |
|---|---|
| 155 | 39 microfarads |
| 163 | 1.5 microfarads |
| 167 | 1 microfarad |

While the invention has been particularly shown and described with reference to preferred embodiments thereof, it will be understood by those skilled in the art that the foregoing and other changes in form and details may be made therein without departing from the spirit and scope of the invention.

I claim:

1. In combination with a circuit of the type in which a network, having a resistor connected in series with parallel-connected capacitive and inductive devices, is connected across the secondary winding of a transformer to equalize delays in input signals applied to the transformer, means producing automatic delay equalization for the input signals comprising an amplifier having input and output terminals at which signal changes are substantially 180° out-of-phase with respect to each other, the terminals being connected across one of the devices to cause the device to act as a reactive shunt feedback, said amplifier including a series input impedance and an impedance shunting the series input impedance, one of the impedances being a semiconductor device having a resistance value which varies as a function of electrical signals applied thereto, a source of delay reference signals, means coupled to the network and to said source producing control signals as a function of the difference in phase between the input signals and the reference signals, and means applying the control signals to the semiconductor device to vary its resistance value, thereby varying the reactive output characteristic of the amplifier as a function of said semiconductor resistance value.

2. The combination of claim 1 wherein the semiconductor device is in the form of a common emitter transistor amplifier with its maximum emitter-to-collector potential maintained at a low level in the order of one hundred millivolts to produce a resistance which varies substantially linearly with changes in control signal level.

3. In combination with a circuit of the type in which a network, having a resistor connected in series with parallel-connected capacitive and inductive devices, is connected across the secondary winding of a transformer to equalize delays in input signals applied to the transformer means producing automatic delay equalization comprising a differential amplifier having input and output terminals at which signal changes are substantially 180° out-of-phase with respect to each other, the terminals being connected across one of the devices to cause the device to act as a reactive shunt feedback, a common emitter transistor amplifier having its collector electrode coupled to the input terminal, including base and emitter electrodes, and operated with a maximum collector-to-emitter potential in the order of one hundred millivolts, a source of delay reference signals, means coupled to the network and to the source producing control signals as a function of the difference in phase between the input signals and the reference signals, and means applying the control signals to the base electrode to vary the reactive output characteristic of the differential amplifier as a function of the control signals.

* * * * *